United States Patent [19]
LaBerdia et al.

[11] Patent Number: 4,624,618
[45] Date of Patent: Nov. 25, 1986

[54] REACH BACK SLAG POT CARRIER

[75] Inventors: William L. LaBerdia; Edward S. Kress; Dennis R. Thomas, all of Brimfield, Ill.

[73] Assignee: Kress Corporation, Brimfield, Ill.

[21] Appl. No.: 704,614

[22] Filed: Feb. 22, 1985

[51] Int. Cl.⁴ ............................................ B65G 65/23
[52] U.S. Cl. .................... 414/420; 180/22; 280/766.1; 298/17 SG; 414/421
[58] Field of Search ............... 414/406, 408, 419–421, 414/486, 487, 498, 546, 555; 280/766.1; 180/22; 298/17 S, 17 SG

[56] References Cited
U.S. PATENT DOCUMENTS

| | | | |
|---|---|---|---|
| 2,313,514 | 3/1943 | Brooks | 298/17 SG |
| 3,249,027 | 5/1966 | Peterson | 180/22 X |
| 3,330,429 | 7/1967 | Kress | 414/421 |
| 3,436,095 | 4/1969 | Preston | 280/766.1 |
| 3,499,561 | 3/1970 | Beckwith | 414/420 |
| 3,825,135 | 7/1974 | Kress | 414/420 |
| 3,863,791 | 2/1975 | Brock | 414/421 |
| 3,973,754 | 8/1976 | Chadwick, Jr. | 280/766.1 X |
| 4,007,847 | 2/1977 | Marco | 280/766.1 X |
| 4,027,808 | 6/1977 | Hardwick | 414/420 |
| 4,063,658 | 12/1977 | Kress et al. | 414/421 |
| 4,122,961 | 10/1978 | Kress | 414/420 |
| 4,168,930 | 9/1979 | Brock | 414/421 |

Primary Examiner—Joseph E. Valenza
Assistant Examiner—David A. Bucci
Attorney, Agent, or Firm—Leydig, Voit & Mayer Ltd.

[57] ABSTRACT

A reach back carrier includes a self-propelled tractor and a wheeled trailer having a generally U-shaped frame with rearwardly projecting side members and a forwardly projecting integral gooseneck pivotally connected to the tractor to permit turning thereof at substantially right angles, a cradle is pivotally mounted adjacent the rear ends of the side members and adapted to engage trunnions on the pot. A rear cross frame is secured between the side members and has rigidly attached rearwardly projecting mounting members thereon with a plurality of trailer wheels journalled on transverse axes adjacent the ends of the side members and mounting members for supporting the trailer, at least one of the wheels on each side of the trailer center line having an axis set forward of the axes of the other wheels, a rear hydraulic actuator secured to at least one of the side members and mounting members behind each of the one wheels, the hydraulic actuator being located substantially within the overall length and width of the trailer defined by the outer perimeter of the wheels and has an outrigger foot for engaging the ground when the pot is lifted and dumped by the cradle, and a primary hydraulic actuator for swinging the cradle about the pivotal mounting for lifting the pot through the trunnions from a position behind the trailer wheels and swinging the pot into a transport position on the trailer ahead of the wheels.

6 Claims, 4 Drawing Figures

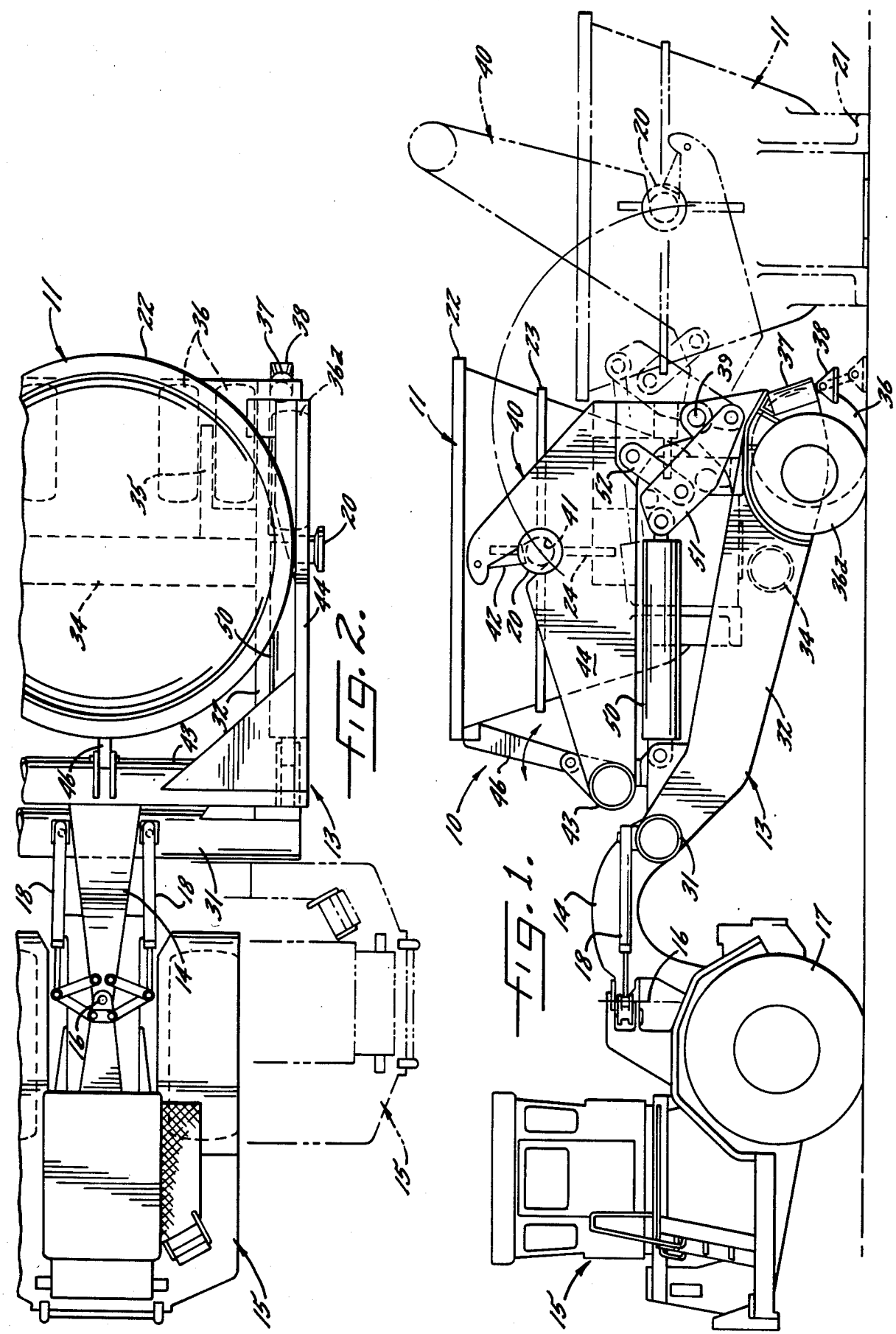

REACH BACK SLAG POT CARRIER

FIELD OF THE INVENTION

The present invention relates generally to carrying and dumping vehicles and more particularly concerns a carrier which can reach back beyond its rear wheels to pick up or dump a heavy bulk material container such as a slag pot, ladle or the like.

BACKGROUND OF THE INVENTION

In U.S. Pat. Nos. 3,825,135; 4,063,658 and 4,122,961 there are disclosed various forms of slag pot handling carriers intended to pick up, transport and dump large ladles or slag pots of the kind used in foundries and other slag generating industries and which weigh, when loaded, on the order of 35 to 200 metric tons. In order to keep the wheel base short and thus permit short turning radii and good maneuverability, each of the carriers disclosed in these prior patents employs a rearwardly open generally U-shaped frame with wheels on the trailing arms thereof adapted to straddle the sides of the pot or ladle as the carrier is backed into position. Other carriers have been made in the past with ladle or pot support linkages arranged to reach back of the carrier rear wheels to pick up a pot setting on the ground or on a suitable transfer car of the like. However, such past reach back type carriers have been characterized by having extremely long wheel bases in order to provide a sufficiently long forward moment arm ahead of the rear carrier wheels to compensate for the rear tilting moment generated upon lifting a heavy pot or ladle located behind the rear carrier wheels. Consequently, this has required long vehicles with large turning radii that could not be maneuvered in close quarters.

OBJECTS AND SUMMARY OF THE INVENTION

It is a primary aim of the present invention to provide a heavy duty reach back type carrier which has a relatively short wheel base and thus a short turning radius and good maneuverability in close quarters. More particularly, it is an object of the invention to provide a carrier of the above type with means behind the axis of the rear carrier wheels for resisting the rearward tilting moment of the carrier as the heavy pot is lifted and swung forward into transport position within the carrier. A related object is to provide a carrier with such means which not only stabilizes the carrier during lifting the pot for loading into and unloading from the carrier but also during dumping of the pot contents.

To this end there is provided a carrier for lifting, transporting and dumping a pot or the like having lateral trunnions, wherein the carrier includes a self-propelled tractor and a wheeled trailer having a generally U-shaped frame with rearwardly projecting side members and a forwardly projecting integral gooseneck pivotally connected to the tractor to permit turning thereof at substantially right angles, a cradle pivotally mounted adjacent the rear ends of the side members and adapted to engage the trunnions and embrace the pot, a rear cross frame secured between the side members and having rigidly attached rearwardly projecting mounting members thereon, means for journalling a plurality of trailer wheels adjacent the ends of the side members and mounting members for supporting the trailer, cradle and pot, at least one of the wheels on each side of the trailer center line having an axis set forward of the axis of the other wheels, means including a hydraulic actuator secured to at least one of the side members and mounting members behind each of the one wheels, the hydraulic actuator having an outrigger foot for engaging the ground when the pot is lifted and dumped by the cradle, and means including a primary hydraulic actuator for swinging the cradle about the pivotal mounting for lifting the pot from a position behind the trailer wheels and swinging the pot into a transport position on the trailer ahead of the wheels. In the preferred embodiment the carrier also includes means for resisting free swinging movement of the pot trunnions in the cradle so as to dump the pot as the cradle is swung rearwardly about the pivotal mounting by the primary hydraulic actuator.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a side elevation of the slag pot carrier of the present invention with the slag pot shown in solid lines in its forward transport position and shown in broken lines in position to be lifted or lowered to the ground by the reach back cradle of the carrier;

FIG. 2 is a fragmentary top plan view of the carrier of FIG. 1;

Figure 3:
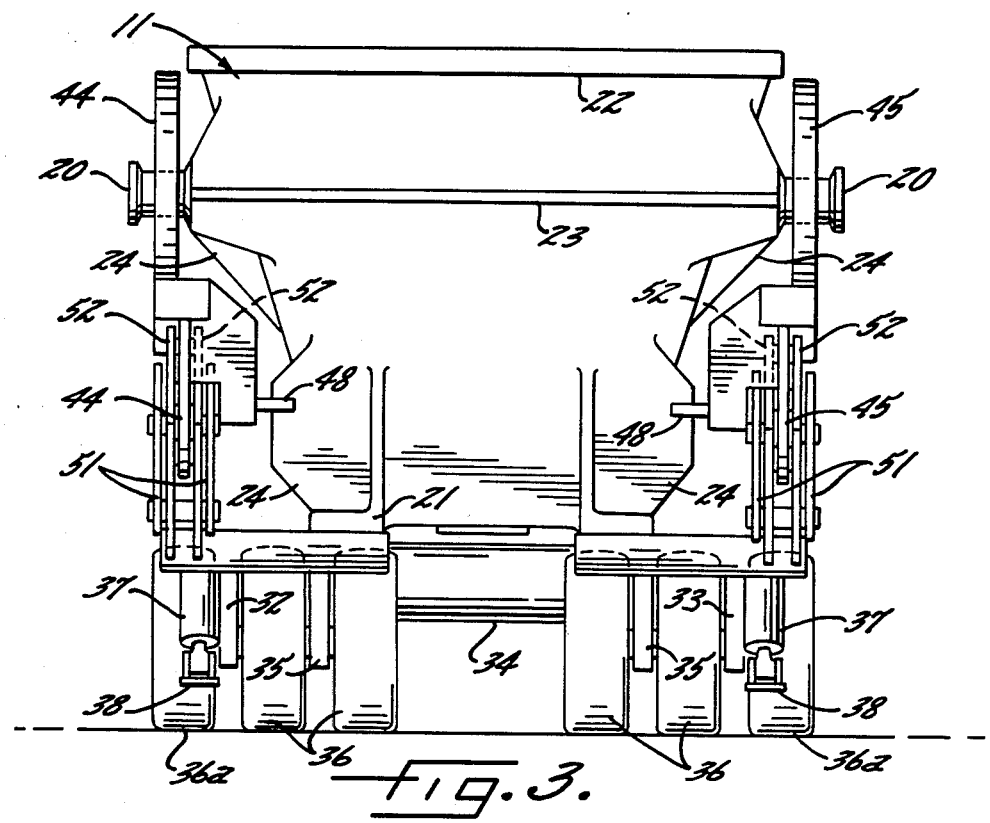
FIG. 3 is a rear elevation of the carrier of FIG. 1.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Turning now to the drawings, there is shown in FIG. 1 a reach back carrier 10 for lifting, transporting and dumping a slag pot 11 or the like. The carrier 10 includes a trailer 13 with a forwardly projecting gooseneck-like member 14 connected to a suitable prime mover such as a two-wheeled tractor 15. The trailer 13 and tractor 15 are pivoted about a vertical axis 16 that passes close to the axis of the tractor ground wheels 17. A pair of steering actuators 18 interconnect the tractor 15 and trailer 13 for pivoting the assembly about the vertical axis 16 to give extremely good maneuverability. The gooseneck-like member 14 provides sufficient clearance so that the tractor 15 can be turned substantially at right angles to the trailer 13 (see FIG. 2) and the carrier 10 can turn substantially within its own length.

The slag pot 11 (or other container) is typically formed with side projections 20 in the form of trunnions for lifting and dumping the pot 11. The pot 11 may also be formed with a reinforced base 21 so that it may sit directly on the ground or on the top of an intermediate carrier. Typically, the pot 11 includes a reinforced upper lip 22 and may also include circumferential and vertical reinforcing flanges 23 and 24 adjacent the centerline of the trunnions 20.

The trailer 13 includes a generally U-shaped main frame 30 including a heavy tubular cross beam 31 integral with the gooseneck 14 and a pair of rearwardly projecting side members 32 and 33 with a tubular rear frame 34 interconnected therebetween. A plurality of mounting members 35 are rigidly attached to the rear frame 34 and project rearwardly therefrom. Means are provided for journalling a plurality of trailer wheels 36 on transverse axes adjacent the ends of the side members 32, 33 and mounting members 35 for supporting the trailer 13.

In accordance with the present invention, at least one of the wheels 36a on each side of the trailer centerline has its axis set forward of the axis of the other trailer wheels 36 and a rear hydraulic actuator 37 is secured to at least one of the members 32, 33, 35 behind each of the forwardly set wheels 36a. As shown in the drawings, the hydraulic actuator 37 is located substantially within the overall length and width of the trailer 13 as defined by the outer perimeter of the wheels 36, 36a and is fitted within an outrigger foot 38 for engaging the ground when the pot 11 is lifted and dumped.

To lift and dump the pot 11, the trailer 13 is provided with a large cradle 40 pivotally mounted at 39 adjacent the rear ends of the side members 32, 33 and having receiving notches 41 adapted to engage the pot trunnions 20. In the preferred embodiment, pivotal keeper elements 42 are provided to keep the trunnions 20 in the notches 41. The cradle 40 is generally U-shaped and substantially embraces the pot 11 with a tubular beam 43 extending across the front between the cradle side plates 44, 45. A strut 46 is pivotally mounted on the cross beams 43 and is selectively engageable with the lip 22 of the pot 11 to keep the pot from swinging free on the trunnions 20.

On each side of the trailer center line, a primary hydraulic actuator 50 is pivoted to respective side frames 32, 33 and to a link 51 also pivoted on the rear of each side frame 32, 33 adjacent and below the pivotal mounting 39 of the cradle 40. An intermediate link 52 interconnects the link 51 and the cradle 40 for tilting the cradle about its pivot 39 as the cylinder 50 is extended or retracted. As shown in FIG. 1 in dash lines the cradle 40 is pivoted rearwardly into a reach back position so the cradle rotates lifting the pot upwardly and forwardly into the transport position shown in solid lines in FIG. 1.

Figure 4:
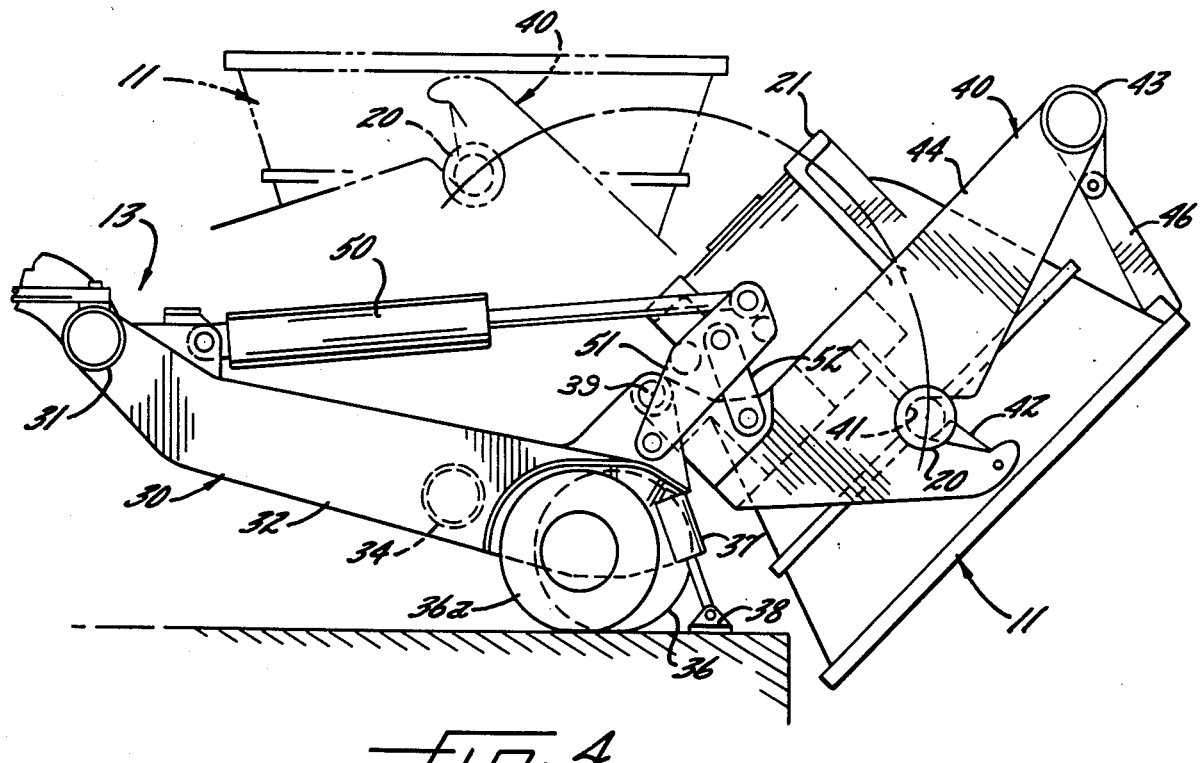
FIG. 4 is a fragmentary side elevation of the carrier with the slag pot shown in dash lines in the transport position and in solid lines in the reach back dump position.

To dump the pot 11, the cradle 40 is rotated rearwardly and the pot is prevented from the free swing movement. This may be done by engaging the strut 46 with the pot lip 22 as noted above and as seen in FIG. 4 the pot rotates into dump position with the cradle. Alternatively, a latch 48 on the cradle may be selectively engaged with a flange 24 to prevent free swinging movement thereof (see FIG. 3).

From the foregoing it will be seen that the reach back carrier of the present invention is extremely compact and can be turned on a very short radius. By providing outrigger jacks behind certain of the rear trailer wheels the rearward tilting moment imposed by lifting the heavy pot is resisted and wheel base of the carrier can be made much shorter. The same cradle linkage used for lifting and loading the pot into the carrier can also be used to dump the pot simply by preventing free swinging movement of the pot in t he cradle as it is pivoted upward and rearward.

We claim as our invention:

1. A carrier for lifting, transporting and dumping a pot or the like having lateral trunnions, comprising in combination, a self-propelled tractor and a wheeled trailer having a longitudinal center line and a generally U-shaped frame with rearwardly projecitng side members and a forwardly projecting integral gooseneck pivotally connected to the tractor to permit turning thereof at substantially right angles, a cradle pivotally mounted adjacent the rear ends of the side members and adapted to engage the trunnions and embrace the pot, a rear cross frame secured between said side members and having rigidly attached rearwardly projecting mounting members thereon, means for journalling a plurality of trailer wheels on transverse axes adjacent the ends of said side members and mounting members for supporting said trailer, cradle and pot, at least one of said wheels on each side of said trailer center line having its axis set forward of the axes of said other wheels by less than the diameter of the wheel, means including a rear hydraulic actuator secured to at least one of said side members and mounting members behind each of said one wheels which is forwardly offset and the hydraulic actuator being substantially within the overall length and width of said trailer as defined by the outer perimeter of said wheels, said hydraulic actuator having an outrigger foot for engaging the ground when said pot is lifted and dumped by said cradle, and means including a primary hydraulic actuator for swinging said cradle about said pivotal mounting on said side members to lift said pot, through said trunnions, from a position behind said trailer wheels and for swinging said pot into a transport position on said trailer ahead of said wheels.

2. A carrier as defined in claim 1 including means for resisting free swinging movement of said pot trunnions in said cradle so as to dump said pot as said cradle is swung rearwardly about said pivotal mounting by said primary hydraulic actuator.

3. A carrier as defined in claim 2 wherein said resisting means includes a compression strut selectively interposed between a forward portion of said cradle and the lip of said pot.

4. A carrier as defined in claim 2 wherein said resisting means includes a latch element on said cradle selectively engageable with a lateral abutment surface on said pot.

5. A carrier as defined in claim 1 wherein said cradle swinging means includes a primary lever arm pivotally connected at one end to said side member adjacent and below said cradle pivotal mounting and pivotally connected at the other end to said primary hydraulic actuator and a secondary lever arm interconnecting said cradle and said primary lever intermediate the ends thereof.

6. A carrier as defined in claim 1 wherein said one wheel is the most outboard wheel on each side of said trailer center line and said rear hydraulic actuator is secured to the outside rear end of said side member.

* * * * *